United States Patent [19]

Hilgendorff et al.

[11] Patent Number: 4,995,977
[45] Date of Patent: Feb. 26, 1991

[54] APPARATUS FOR FILTERING AND SEPARATING FLOW MEDIUM

[75] Inventors: Walter Hilgendorff, Tespe; Gerhard Kahn; Jürgen Kaschemekat, both of Geesthacht, all of Fed. Rep. of Germany

[73] Assignee: GKSS- Forschungszentrum Geesthacht GmbH, Geesthact, Fed. Rep. of Germany

[21] Appl. No.: 308,853

[22] Filed: Feb. 9, 1989

[30] Foreign Application Priority Data

Feb. 9, 1988 [DE] Fed. Rep. of Germany ....... 3803886

[51] Int. Cl.$^5$ ............................................ B01D 65/04
[52] U.S. Cl. .......................... 210/321.69; 210/321.84; 210/456
[58] Field of Search .................. 210/321.84, 486, 414, 210/415, 321.69, 321.63, 347, 456

[56] References Cited

U.S. PATENT DOCUMENTS 4,228,014 10/1980 Timm et al. ............... 210/321.84 X
4,631,130 12/1986 Watanabe ................... 210/321.84 X
4,740,312 4/1988 Dahlquist et al. ......... 210/321.63 X Primary Examiner—Frank Spear
Attorney, Agent, or Firm—Robert W. Becker & Associates

[57] ABSTRACT

An apparatus for filtering and separating flow medium by reverse osmosis, ultrafiltration, and microfiltration. A plurality of essentially sheet-like filter elements are disposed next to, and spaced from, one another so a to form flow chambers for the flow medium. Filtrate that is produced is withdrawn at the end face of at least one hole formed in a filter element and disposed at essentially right angles to the planar surface thereof. A plurality of sheet-like, self-supporting filter element carriers that are successively arranged have disposed essentially laminarly thereon the filter elements, with the filter element carriers being spaced from one another at such a distance that there is formed between each two facing filter elements one of the flow chambers. Disposed in each flow chamber, between two facing filter elements, is a disk that imparts turbulence to flow medium in the flow chamber.

9 Claims, 3 Drawing Sheets

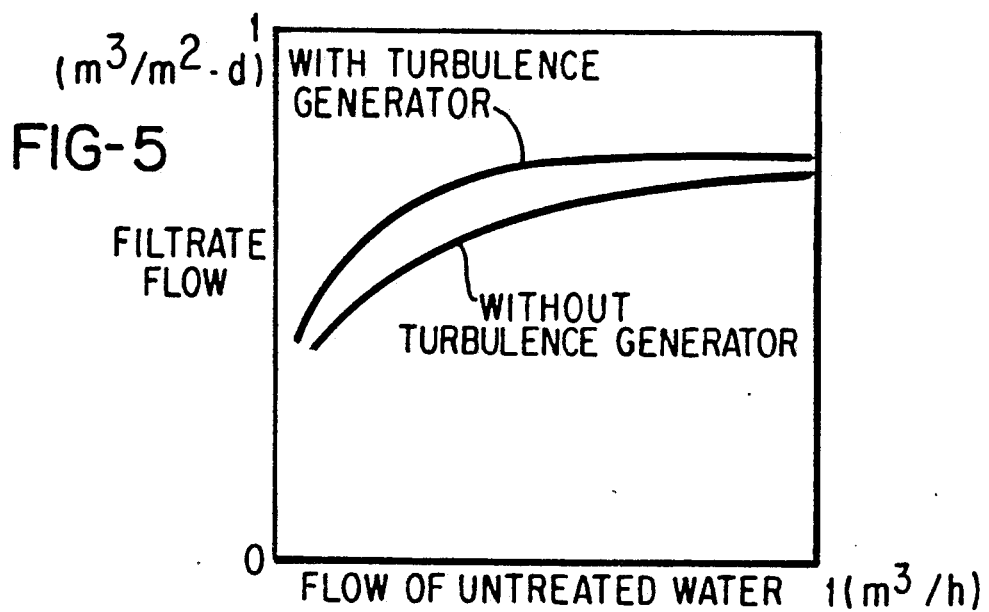
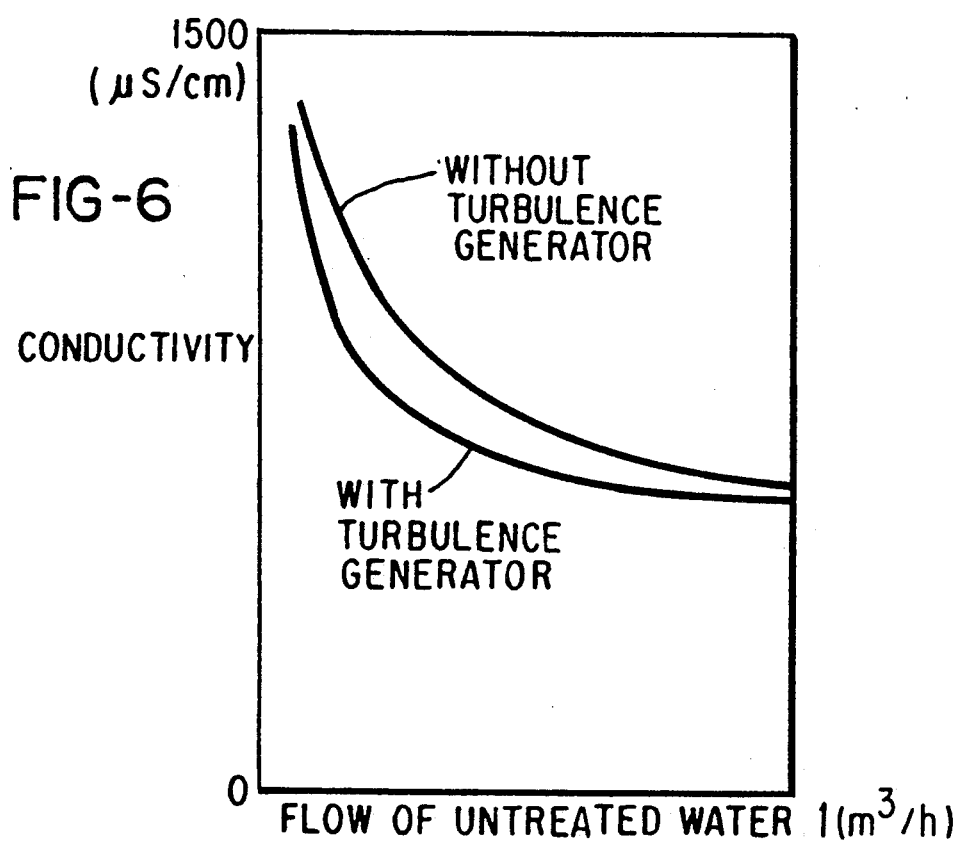

APPARATUS FOR FILTERING AND SEPARATING FLOW MEDIUM

BACKGROUND OF THE INVENTION

The present invention relates to an apparatus for filtering and separating flow medium by reverse osmosis, ultrafiltration, and microfiltration. A plurality of essentially laminar or sheet-like filter elements are disposed next to, and spaced from, one another in such a way as to form respective flow chambers for the flow medium. Filtrate that is produced is withdrawn at the end face of at least one hole formed in a filter element and disposed essentially at right angles to the planar surface of that filter element.

With apparatus of this type (German Offenlegungsschrift 35 07 908 A-Hilgendorff dated Sept. 11, 1986 and corresponding British Pat. No. 2,173,421 A-Hilgendorff et al dated Oct. 15, 1986, both belonging to the assignee of the present invention), the filter elements (diaphragms) were up to now accommodated in separate support frames that comprised an outer ring and an inner ring, between which were disposed a lattice and a fabric mesh having projections. Resting against the outer and inner rings, any desired number of such support frames were disposed next to one another while sandwiching therebetween a filter element, with the outer and inner rings assuring a fixed connection of the thus formed apparatus. It has been shown that with the use of such element carriers against those parts of the support frame that contact the filter element, in the previously described example the lattice with the projections disposed thereon, the filtrate yield is reduced during the course of time, resulting in an overall reduction of the separating efficiency of the apparatus.

The reason for this is that in the flow shadows of the contact points of the projections against the filter element surface, crystallization seeds are formed for the precipitation of the materials contained in the flow medium and for increased deposition of impurities. Although the reduction of the separating efficiency of the apparatus can be counteracted by increasing the velocity of the flow medium in the apparatus, so that the formation of crystallization seeds on the contact points and the deposition of dirt thereon is reduced, this method on the one hand is insufficient to continuously maintain a constant separating capacity for the apparatus, and on the other hand the increase of the velocity of the flow medium is accompanied by an increased energy consumption for the pump devices, and the apparatus must be designed for the increased pressure difference, which in turn makes the device considerably more expensive.

It is an object of the present invention to provide an apparatus with which in a straightforward manner the formation of crystallization seconds on the surface of the filter elements, and hence a deposition of impurities carried by the flow medium, is reduced, so that in a straightforward manner the separating capacity of the apparatus is retained, and the apparatus as a whole can be manufactured in a more economical manner than was possible with the heretofore known apparatus.

BRIEF DESCRIPTION OF THE DRAWINGS

This object, and other objects and advantages of the present invention, will appear more clearly from the following specification in conjunction with the accompanying schematic drawings, in which:

FIG. 5 is a view that shows a graph in which the filtrate flow is plotted against the flow of untreated water, with and without a disk that generates the turbulence; and FIG. 6 is a view that shows a graph in which the conductivity is plotted against the flow of untreated water, again with and without a disk for generating the turbulence.

SUMMARY OF THE INVENTION

Figures 1, 2:
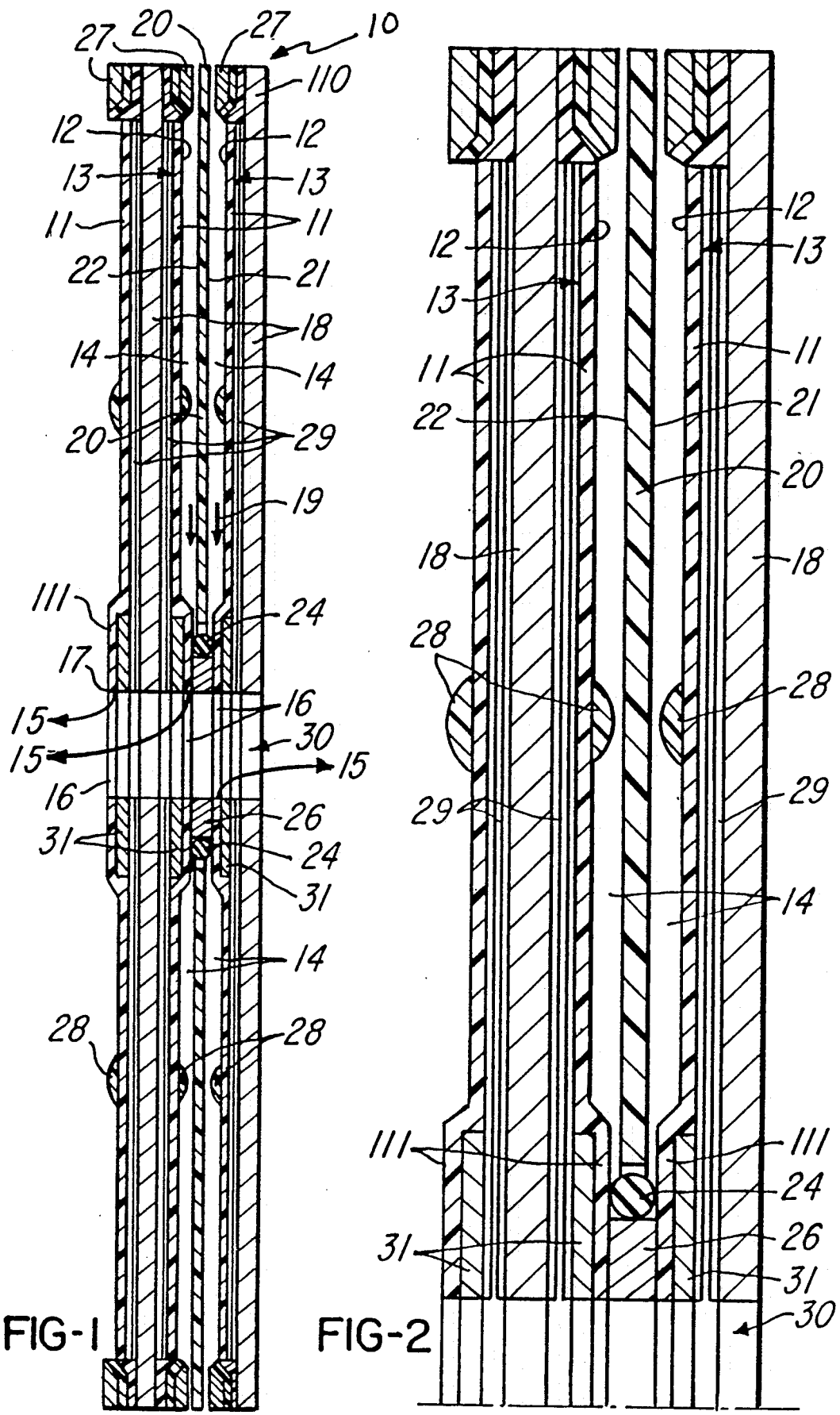
FIG. 1 is a cross-sectional view of one exemplary embodiment of part of the inventive apparatus, which is formed from two filter element carriers, on one of which is disposed one filter element, and on the other of which are disposed two filter elements.
FIG. 2 is an enlarged crosssectional view of the upper portion of the apparatus part illustrated in FIG. 1.

The apparatus of the present invention is characterized primarily by: a plurality of sheetlike, self-supporting, filter element carriers that are successively arranged and have opposite sides, upon each interior one of which is disposed essentially laminarly a filter element, with the filter element carriers being spaced from one another by such a distance that when filter elements are disposed thereon, there is formed between each two facing filter elements one of the flow chambers; and, disposed in each flow chamber, between two facing filter elements a plate or disk that imparts turbulence to the flow medium in the flow chamber.

The advantage of the inventive apparatus is essentially that due to the disk that is disposed between two filter elements in the flow chamber, turbulence is imparted to the flow medium as it passes through the flow chamber, so that as a result a formation of crystallization seeds for the precipitation of flow medium components, and the deposition of impurities, is prevented, and due to the sheet-like, self-supporting, filter element carriers no support in the nature of spacers or projections is required for fixing the filter element. These two features have a cooperative effect, so that over the entire filter element surface the turbulence is increased and the separating capacity of the apparatus is improved.

Pursuant to one advantageous specific embodiment of the present invention, the disk is disposed between two filter elements in such a way that on the one hand it essentially does not contact the filter elements, and on the other hand is movable in at least one axis of freedom. Due to this movability of the disk, the turbulence in the flow medium in the flow chamber is preferably increased even further, i.e. due to the movement of the disk caused by the flow medium.

The disk itself is advantageously provided with a plurality of holes or openings that extend essentially at right angles to the surface of the disk, and that in principle can have any desired cross-sectional configuration. The holes preferably have a semicircular cross-sectional configuration. The number and arrangement of the holes on the disk can be arbitrarily selected, and the shape thereof can be a function of the type of flow medium that is to be separated.

Depending upon the construction of the apparatus, the disk can be fixed between the filter elements that face one another in a flow chamber in very different ways. Especially where the filter elements have an essentially symmetrical, for example circular, shape, it is advantageous for the disk to have a fixing or locating hole that is disposed essentially axially relative to the hole of the filter element, so that it is possible in an easy manner to align the filter elements, filter element carriers, and disks.

Pursuant to another embodiment of the present invention, the disk, via an annular sealing member that is disposed in the fixing or locating hole, is supported on a spacer that is provided in the center of the fixing or locating hole and has a greater thickness than does the disk, with the disk being sandwiched between two filter elements via this spacer. Fixing the disk in this manner makes it possible for the disk to move slightly not only in the axial direction relative to the hole of the filter element, but rather also slightly about the axis of the hole, thereby still further increasing the possibility of forming a turbulent flow of the flow medium. However, in order to be able to regulate the movability of the disk that causes the turbulence, whereby within certain limits the intensity of the turbulence of the flow medium is also affected, it is proposed pursuant to another embodiment of the inventive apparatus to dispose on that filter element surface that faces the flow chamber a plurality of raised portions that project from the surface of the filter but that normally do not come into contact with the adjacent filter element surfaces.

The raised portions are advantageously formed at least by one annular member that extends about the filter element at its outer rim region, and by one annular protuberence or projection of the filter element that projects essentially to the same height and in the same direction as does the annular member. The annular member formed on the outer rim region of the filter element, in addition to its function of fixing the movability of the disk that generates the turbulence, also has the function of increasing the stability of the sheetlike filter element carrier, so that even during extremely high operating and differential pressures of the flow medium, no other support in the nature of spacers or the like is necessary. The inherent stability of the self-supporting, filter element carrier is thus increased in a simple manner. Pursuant to one specific embodiment of the present invention, the annular member can be formed by an adhesive layer.

Finally, it is advantageous to also form raised portions by a plurality of point-type projections that are distributed over the surface of the filter element and that similarly serve to fix the movability of the disk and to establish the desired intensity of the turbulence in the flow chamber.

Further specific features of the present invention will be described in detail subsequently.

DESCRIPTION OF PREFERRED EMBODIMENTS

Referring now to the drawing in detail, the apparatus 10 of the present invention is schematically illustrated in FIG. 1 and in the enlarged partial cross-sectional view of FIG. 2. To facilitate illustration, FIGS. 1 and 2 show only two so-called filter pockets or cells, which are disposed next to one another. A desired number of pockets disposed next to one another form the apparatus 10, with the number of pockets depending upon the type of the flow medium that is to be separated and the circumstances under which the apparatus 10 is used. However, for the purpose of illustrating the inventive principle, it is sufficient to describe merely two filter pockets.

A filter pocket essentially comprises a platelike or disk-like filter carrier element 18, on each side of which is placed a laminar or sheetlike filter element 11, which can, for example, be a pocket-like diaphragm filter, along with an intermediate layer 29 in the form of fleece. This construction applies in principle for all of the aforementioned pockets.

Disposed between the facing filter elements 11 of two adjacent pockets is a plate or disk 20, with the one surface 21 of the disk 20 being disposed across from the outer filter surface 12, and the second surface 22 of the disk 20 being disposed across from the filter surface 12 of the filter element 11 of the adjacent filter pocket. A flow chamber 14 is formed between two facing filter elements 11 of two adjacent pockets; the flow medium 19 that is to be separated flows in this flow chamber 14. The disk 20 is essentially centrally disposed in the flow chamber 14 between the two outer filter element surfaces 12, and in particular in such a way that the disk 20 does not contact the filter elements 11.

Figure 4:
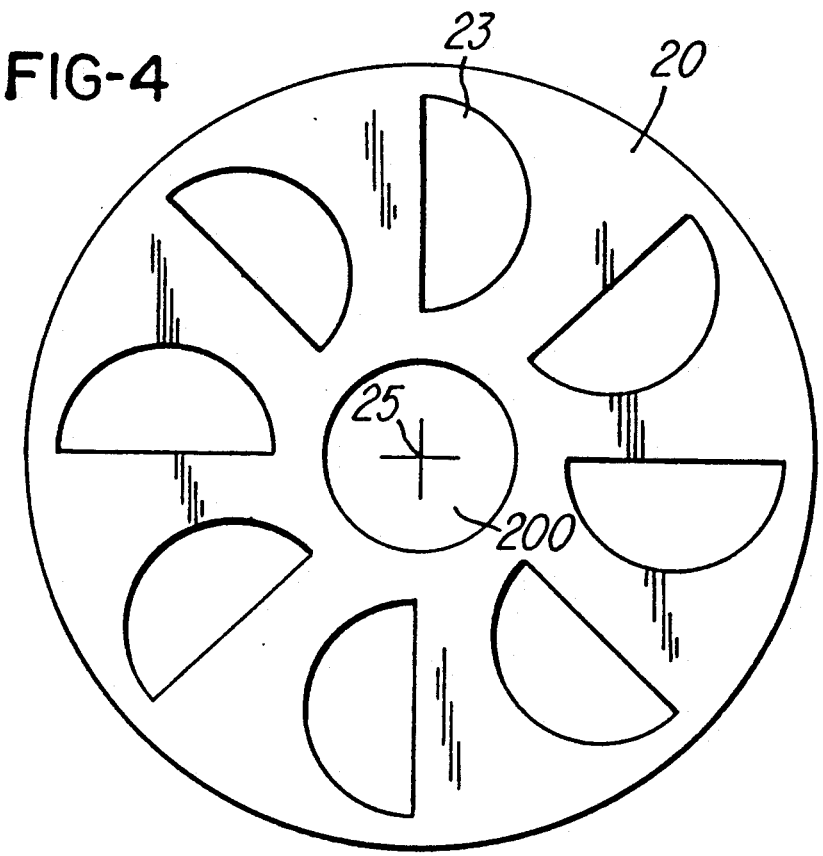
FIG. 4 is a plan view of a disk that generates the turbulence in the flow chamber.

In the embodiment being described, the disk 20 (see FIG. 4) has an essentially circular configuration, and is provided at its center 25 with a fixing or locating hole 200. In addition, the circular face of the disk 20 is provided with a plurality of openings 23, which in the illustrated embodiment have a semicircular cross-sectional configuration. However, it should be noted that the type of construction of the openings 23, their arrangement upon the disk 20, and the number thereof can be selected in any suitable fashion.

The disk 20 is essentially radially and axially aligned with the filter elements 11 and the filter element carriers 18 via a spacer 26. In particular, in the illustrated embodiment this alignment is furthermore effected by disposing an annular sealing member 24, which is preferably an O-ring, in the fixing hole 200 of the disk 20. As can be seen from FIGS. 1 and 2, the annular sealing member 24 establishes a sealed end between two facing filter element surfaces 12 and a spacer 26 that in the assembled state of the apparatus 10 is disposed in the fixing hole 200 and is also disposed between two facing filter element surfaces 12 of two adjacent pockets. The thickness of the spacer 26 is slightly greater than the thickness of the disk 20.

Figure 3:
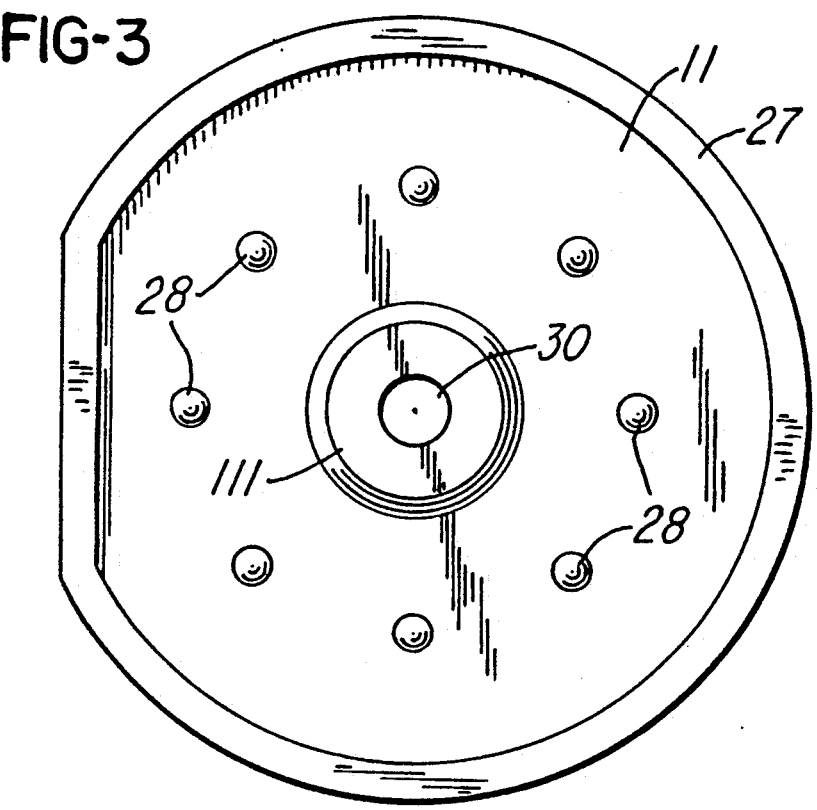
FIG. 3 is a plan view of a filter element carrier upon which is disposed a filter element.

The outer rim region 110 of each filter element 11 is provided, as a raised portion, with an annular member 27 that extends around the filter element 11. The member 27 is adhesively joined to the outer rim region 110 of the filter element 11. As most clearly seen in FIGS. 2 and 3 in the center of the filter element 11 a raised portion, of essentially the same height and direction as the aforementioned annular member 27, is formed by a projecting, annular protuberance 111. Just as in the case of the aforementioned annular member 27, this protuberance or projection 111 has a spacing effect, which will be described in detail subsequently. Formed on the filter surface 12 that is directed toward the flow chamber 14 are a plurality of projections or raised portions 28, which also have spacing functions as will be described in detail subsequently. The annular projection 111 of the filter element 11 toward the center, i.e. toward the filtrate discharge hole or outlet 30, can be obtained by placing about the central filtrate outlet 30 a support disk 31 that has such a thickness or height that the filter element 11 projects by this amount in the form of the protuberance or projection 111.

The height or thickness of the outer annular member 27, the height of the raised portions 28, as well as the height of the projection 111, relative to the surfaces of the filter element carrier 18, is such that the disk 20 is movable at least in one axis of freedom, i.e. in the axial direction of the apparatus 10. The disk 20 can also rotate slightly about the axis of the apparatus 10.

It should be noted that all of the aforementioned raised portions 27, 28, and 110 serve to fix or limit the movability of the disk 20, or, expressed in other terms, to maintain two uniform gaps between the disk 20 and the filter element surfaces 12.

During operation, the flow medium 19 flows in a known manner into the flow chambers 14, from a non-illustrated flow medium inlet, to a non-illustrated flow medium outlet, where it leaves the apparatus 10 as concentrate. Out of the flow medium 19, the filtrate passes separately into the flow chambers 14, over the filter elements 11, and over the end faces 17 of the hole 16 of the filter element 11 into the filtrate outlet 30, with these procedures progressing in generally the same known manner with apparatus of this type. During operation of the inventive apparatus 10, due to the turbulence of the flow medium 19 of the disks 20 that are provided in the flow chambers 14, there is assured that from those sides of the filter element surfaces 12 that face the flow chamber 14 no impurities can be deposited and also no crystallization seeds form for the precipitation of flow medium components. It has been shown that during operation of the inventive apparatus using the disks 20 that generate the turbulence, no flow shadow regions of the flow medium have formed in the flow chamber 14.

FIG. 5 shows that the quantity of filtrate delivered by the apparatus 10, at the same throughflow of medium (untreated water), is significantly greater with the installation of the turbulence-generating disk 20 than without the disk 20. The increase is due to the fact that with an increased salt concentration at the filter element surface 12, the osmotic pressure increases while at the same time reducing the effective operating pressure (effective operating pressure = operating pressure − osmotic pressure). The flow of filtrate through a diaphragm thus increases as the salt concentration at the filter element surface 12 decreases. Due to the presence of the turbulence generator (disk 20), the salt concentration, i.e. the boundary layer, is decreased and hence the flow of filtrate is increased.

In FIG. 6, the conductivity is plotted as a function of the flow of untreated water with and without the disk 20. The salt drift through a diaphragm (filter element 11) is directly proportional to the difference of the salt concentrations between the filter element surfaces 12 and 13. This is independent of the pressure, in contrast to the filtrate flow. Thus, if the concentration difference is reduced by the turbulence generator (disk 20), the conductivity and hence the salt content in the filtrate are also simultaneously reduced.

It should finally be noted that the inventive apparatus is in principle suitable for use with all flat filter elements, especially diaphragm filters or the like.

The flat filter element carrier disk 18 can be made of any suitable material, such as polyetherimide. The carrier disk 18 must be capable of being adhesively joined to the filter element 11 or the intermediate layer 29, and must be resistant to and compatible with foodstuffs. Other examples of possible materials for the filter element carrier 18 are ABS and PVC. The disk 20 is preferably made of polyetherimide, but any other suitable material could also be used. The annular member 27 and the support disks 31, which effect the projection 111 of the filter element 11, preferably have a thickness of 0.25 mm.

The present invention is, of course, in no way restricted to the specific disclosure of the specification and drawings, but also encompasses any modifications within the scope of the appended claims.

What we claim is:

1. In an apparatus for filtering and separating flow medium by reverse osmosis, ultrafiltration, and microfiltration, with a plurality of essentially sheet-like filter elements being disposed next to, and spaced from, one another in such a way as to form respective flow chambers for the flow medium, and with filtrate that is produced being withdrawn at the end face of at least one hole formed in a filter element and disposed essentially at right angles to the planar surface of that filter element, the improvement comprising:

a plurality of sheet-like, self-supporting, filter element carriers that are successively arranged and have opposite sides, upon each interior one of which is disposed essentially laminarly a respective one of said filter elements, with said carriers being spaced from one another by such a distance that when said filter elements are disposed thereon, one of said flow chambers is formed between each two facing filter elements; and disposed in each flow chamber, between two facing filter elements, a respective disk that imparts turbulence to said flow medium in said flow chamber, with a given one of said disks being disposed between two filter elements in such a way that said disk essentially does not contact said two filter elements and also is movable in at least one axis of freedom.

2. An apparatus according to claim 1, in which each of said disks is provided with a plurality of openings that essentially extend perpendicular to the surfaces of said disk.

3. An apparatus according to claim 2, in which each of said openings has a semicircular cross-sectional configuration.

4. An apparatus according to claim 2, in which each of said disks is provided with a fixing hole that essentially extends axially relative to said hole of said filter element.

5. An apparatus according to claim 4, in which said fixing hole of said disk has a center in which is disposed a spacer, the thickness of which is greater than the thickness of said disk, with said disk being supported on said spacer via the interposition in said fixing hole, of an annular sealing member, and with said disk being supported between two filter elements via said spacer.

6. An apparatus according to claim 2, in which each of said filter elements, on a surface thereof that faces a flow chamber, is provided with a plurality of projecting members that project beyond said surface of said filter element.

7. An apparatus according to claim 6, in which said filter element has a radially outer rim portion, with said projecting members including an annular member that extends about said filter element at said outer rim portion thereof, and with said projecting members also including an annular protuberance of said filter element that projects therefrom to essentially the same extent and in the same direct ion as does said annular member.

8. An apparatus according to claim 7, in which said annular member is formed by an adhesive layer.

9. An apparatus according to claim 7, in which said projecting members further include a plurality of point-type projections that are distributed over said surface of said filter element.

* * * * *